(12) United States Patent
Yacoby (10) Patent No.: US 11,434,025 B2
(45) Date of Patent: Sep. 6, 2022

(54) DEPLOYABLE SPACE VEHICLE

(71) Applicant: ISRAEL AEROSPACE INDUSTRIES LTD., Lod (IL)

(72) Inventor: Erez Yacoby, Nof Aylon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 105 days.

(21) Appl. No.: 16/964,307

(22) PCT Filed: Jan. 15, 2019

(86) PCT No.: PCT/IL2019/050055
§ 371 (c)(1),
(2) Date: Jul. 23, 2020

(87) PCT Pub. No.: WO2019/155455
PCT Pub. Date: Aug. 15, 2019

(65) Prior Publication Data
US 2021/0039811 A1 Feb. 11, 2021

(30) Foreign Application Priority Data
Feb. 12, 2018 (IL) .......................................... 257491

(51) Int. Cl.
*B64G 1/10* (2006.01)
*B64G 1/24* (2006.01)
*B64G 1/42* (2006.01)

(52) U.S. Cl.
CPC ........... *B64G 1/1021* (2013.01); *B64G 1/244* (2019.05); *B64G 1/428* (2013.01); *B64G 2001/1028* (2013.01); *B64G 2001/1092* (2013.01)

(58) Field of Classification Search
CPC ...... B64G 1/1021; B64G 1/244; B64G 1/428; B64G 2001/1028; B64G 2001/1092;
(Continued)

(56) References Cited

U.S. PATENT DOCUMENTS 3,782,835 A 1/1974 Raymond
6,061,999 A 5/2000 Wingert
(Continued)

FOREIGN PATENT DOCUMENTS

| CN | 104155747 A | 11/2014 |
| WO | 2017055750 A1 | 4/2017 |
| WO | 2017055770 A1 | 4/2017 |

OTHER PUBLICATIONS

International Search Report from International Application No. PCT/IL2019/050055 dated Apr. 18, 2019.

*Primary Examiner* — Valentina Xavier
(74) *Attorney, Agent, or Firm* — Dorsey & Whitney LLP (57) ABSTRACT

A space vehicle comprising an optical system having a field of view, the optical system comprising at least two optical elements spaced from one another along an optical axis, thereby defining an interior cavity; at least one control system comprising at least one physical element configured for performing function(s) for enabling operation of the vehicle; and at least one holding assembly for holding the at least one control system and comprising a folding mechanism configured to move between a folded position corresponding to an inoperative mode of the optical system, and a deployed position corresponding to an operative mode of the optical system, such that in the folded position, the control system is at least partially located in the interior cavity for stowage, and in the deployed position, the control system is located outside the interior cavity and outside the field of view of the optical system, allowing operation of the optical system.

13 Claims, 5 Drawing Sheets

(58) Field of Classification Search
CPC .... B64G 1/1007; B64G 1/1014; B64G 1/222; B64G 1/66
See application file for complete search history.

(56) References Cited

U.S. PATENT DOCUMENTS

| | | | |
|---|---|---|---|
| 6,683,311 | B1 | 1/2004 | Wueest |
| 8,531,524 | B2* | 9/2013 | do Carmo Miranda ..................... H01Q 19/10 348/144 |
| 8,967,545 | B2 | 3/2015 | Manzoni |
| 9,389,411 | B1 | 7/2016 | Granger et al. |
| 2002/0135532 | A1* | 9/2002 | Chiang ................ H01Q 3/20 343/880 |
| 2002/0145082 | A1 | 10/2002 | Bertheux et al. |
| 2014/0097981 | A1* | 4/2014 | Celerier ................ B64G 1/54 342/352 |
| 2018/0290768 | A1* | 10/2018 | Faye ...................... B64G 1/402 |
| 2021/0086923 | A1* | 3/2021 | Halsband ............. B64G 1/1078 |

\* cited by examiner

DEPLOYABLE SPACE VEHICLE

TECHNOLOGICAL FIELD

The presently disclosed subject matter relates to space vehicles in general and more specifically to space vehicles that are deployable from a compact configuration.

BACKGROUND ART

References considered to be relevant as background to the presently disclosed subject matter are listed below:
U.S. Pat. No. 8,531,524
U.S. Pat. No. 6,683,311
WO 2017/055770
U.S. Pat. No. 9,389,411
U.S. Pat. No. 3,782,835
CN 104155747
U.S. Pat. No. 8,967,545

Acknowledgement of the above references herein is not to be inferred as meaning that these are in any way relevant to the patentability of the presently disclosed subject matter.

BACKGROUND

Space vehicles are generally designed for two different environments, the launch environment and the orbital environment. At launch, a space vehicle must be packed into a launch vehicle, generally requiring that the space vehicle fits within some specific confined space. However, in an orbital environment, the structure may generally be large, since there are generally no size constraints upon the space vehicle once deployed. Spacecraft are thus typically constrained in their dimensions by the volume available within the fairing of the launch rocket. Hence, a structure with an optical instrument cannot always be positioned in the reduced volume available under the nose cone of a launch vehicle. This has led to the development of various types of deployable structures which can be stowed into a relatively small volume for launch, and later deployed to increase the dimensions of the spacecraft. Certain optical instruments put on board space vehicles have been equipped with a retractable optical element, mainly a secondary mirror of an optical telescope. Such an optical element has a retracted or folded configuration when they are placed under the nose cone of the launch vehicle. They are generally clamped by devices called "stacking" devices which allow them to bear the accelerations and vibrations of the launch. When the space vehicle is separated from the launch vehicle, command devices allow the optical element to be brought into an active or deployed configuration. To fit the system requirements after launch, the deployable structure is typically equipped with a robust calibration system. Moreover, after deployment, the position of the optical instruments should be adjusted with respect to other optical elements in the optical instrument and with respect to the space vehicle for accurate measurement performance. This deployment requires accuracy of micrometers, and precision which may be less than that of micrometers.

General Description

The present invention exploits the free space (volume) defined by an interior cavity of an optical system body to reduce the general volume of the space vehicle. The space vehicle may be a satellite of any type or a spacecraft equipped with an optical instrument. More specifically, in the space vehicle of the present invention, at least one control system configured for controlling operation of the vehicle is accommodated within the optical system (e.g. imaging system) in the free space between the optical elements of the optical system. In the configuration of the present invention, at least one control system is placed within the optical system when the space vehicle is in its stowed position. After launch, the control system is deployed outwardly, leaving the space within the optical system and enabling imaging of incoming electromagnetic radiation. It should be noted that due to the special configuration of the deployable space vehicle of the present invention in which the control system(s) are deployed outwardly and not the optical elements, the required accuracy of the deployment is much lower than the accuracy required for deployment of optical elements. In this way, the optical system might have a larger volume leading to an increase in the optical properties of the optical system and of the performance of the optical system, as well as of the space vehicle. To provide high resolution imagery of distant extended scenes, relatively large aperture optical systems are required. Increasing the diameter of an optical system such as a telescope, increases its resolution of fine detail in proportion to the telescope diameter.

Therefore the present invention provides a space vehicle comprising an optical system having a field of view, the optical system comprising at least two optical elements spaced from one another along an optical axis of the optical system, thereby defining an interior cavity of the optical system; at least one control system, the control system comprising at least one physical element configured for performing one or more functions for enabling operation of the vehicle; and at least one holding assembly for holding the at least one control system, the holding assembly comprising a folding mechanism configured and operable to move between a folded position corresponding to an inoperative mode of the optical system, and a deployed position corresponding to an operative mode of the optical system, such that in the folded position of the folding mechanism, the control system that is held by the holding assembly is at least partially located in the interior cavity of the optical system for stowage, and in the deployed position of the folding mechanism, the control system that is held by the holding assembly is located outside the interior cavity and outside the field of view of the optical system, thereby allowing operation of the optical system.

In some embodiments, the optical system comprises a telescope having a primary optical element and a secondary optical element. The control system is then positioned in between the primary and secondary optical elements.

In some embodiments, the space vehicle comprises a plurality of control systems, each being configured to be deployable and mounted on a holding assembly respectively. The control system(s) may comprise a processing unit configured to control space vehicle operations and/or an image processing module configured to process imaging data collected by the optical system and/or a guiding module configured for guiding the vehicle and/or a receiving/transmitting device configured for receiving/transmitting signals and/or an amplifier device operable for amplifying signals received by the receiver and/or at least one power source configured for supplying voltage supply to the vehicle.

In some embodiments, the folding mechanism is configured and operable for being pivotally displaceable around an axis perpendicular to the optical axis, from the folded position to the deployed position. Alternatively, the folding mechanism may be configured and operable for being pivotally displaceable around an axis parallel to the optical axis from the folded position to the deployed position. Alternatively, the folding mechanism may be configured and operable for being longitudinally displaceable along an axis perpendicular to the optical axis.

In some embodiments, the space vehicle comprises a frame comprising a plurality of surfaces forming an internal cavity and at least one opening in the frame, wherein the at least one holding assembly is mounted on at least one of the plurality of surfaces and at least partially covering the at least one opening when in its folded position. The folding mechanism may then comprise at least one support surface carrying the at least one control system and an axial hinge connecting between one of the surfaces of the frame and the support surface.

In some embodiments, in the deployed position, the support surface is substantially perpendicular to the optical axis of the optical system. Alternatively, in the deployed position, the support surface is substantially parallel to the optical axis of the optical system.

In some embodiments, the axial hinge may have a main direction substantially parallel to the optical axis. Alternatively, the axial hinge may have a direction substantially perpendicular to the optical axis.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
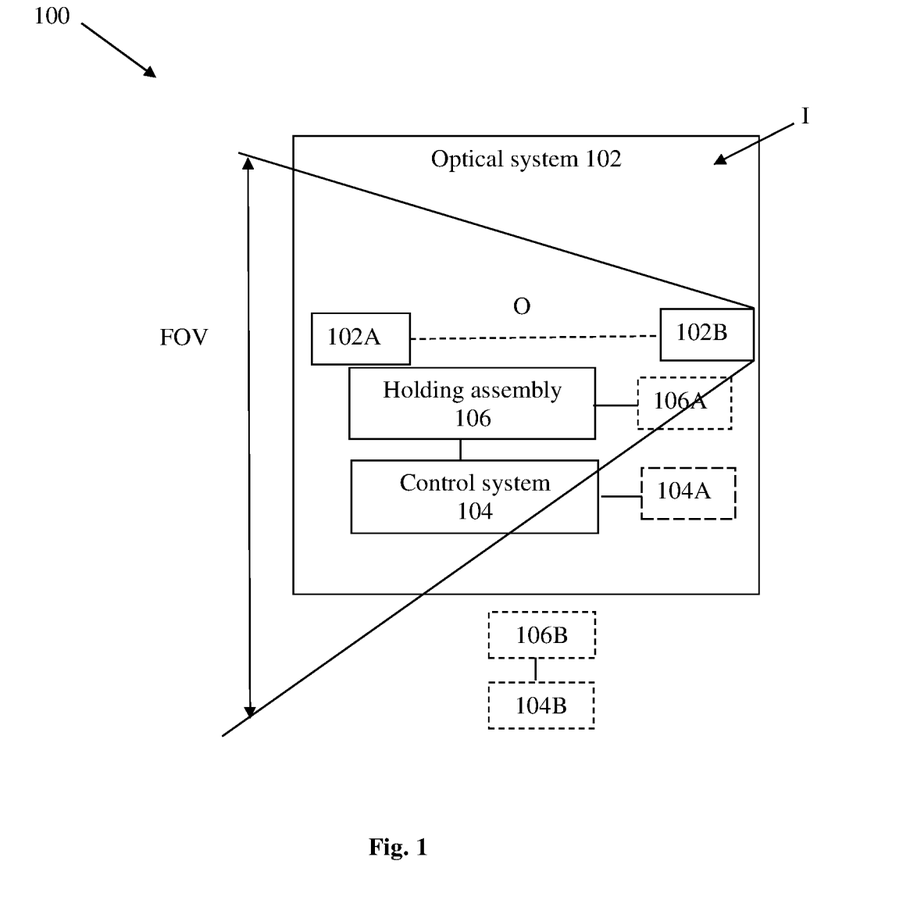
FIG. 1 represents a functional description of a possible configuration of the deployable space vehicle of the present invention.

Reference is made to FIG. 1 representing a block diagram of the main functional element of the deployable space vehicle 100 according to the teachings of the present invention. Deployable space vehicle 100 comprises inter alia an optical system 102 having a certain field of view FOV and defining an interior cavity I. Optical system 102 comprises at least two optical elements 102A and 102B spaced from one another along an optical axis O. Optical elements 102A and 102B are configured for collecting and focusing incoming radiation to create a magnified image. The optical system 102 may be an optical telescope or any other imaging system. If the optical system 102 is an optical telescope, it comprises an arrangement of optical elements including at least two surfaces i.e. primary and secondary optical elements 102A and 102B. The optical telescope may be a refracting telescope using lenses to form the image, a reflecting telescope using an arrangement of mirrors to form the image, or a catadioptric telescope using an arrangement of mirrors and lenses to form an image. Deployable space vehicle 100 also comprises at least one holding assembly 106 for holding at least one control system 104 having at least one physical element configured for performing one or more functions for enabling operation of vehicle 100. The holding assembly 106 comprises a folding mechanism configured and operable to move the control system 104 from a folded position 104A corresponding to an inoperative mode of the optical system 102 to a deployed position 104B corresponding to an operative mode of the optical system 102. The folding mechanism may be a mechanical element selectively moving control system 104 into and out of the free space (i.e. interior cavity I) of the optical system 102.

In the folded position 104A of the folding mechanism, the control system 104 is held by the holding assembly 106A being at least partially located in the interior cavity I of the optical system 102 for stowage. In the folded position 104A, control system 104 is positioned in between optical elements 102A and 102B obtruding the field of view FOV. In the deployed position 104B of the folding mechanism, the control system is held by the holding assembly 106B being located outside the interior cavity and outside the field of view FOV of the optical system 102 thereby allowing operation of the optical system 102.

Figure 2:
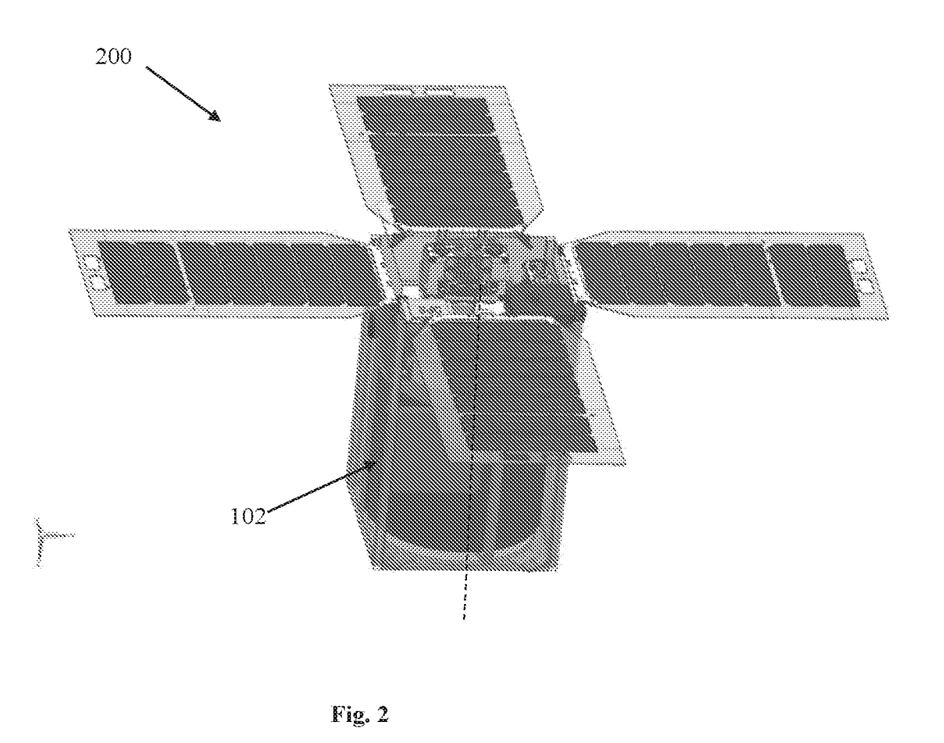
FIG. 2 shows a schematic top view of a possible configuration of the deployable space vehicle in its folded position according to some embodiments of the present invention.

Reference is made to FIG. 2, representing a top view of a space vehicle 200 being, in this specific and non-limiting example, a satellite in its folded position. The deployable space vehicle of the present invention is not limited to any vehicle and may be a satellite such as an earth observation satellite, orbiting observation satellite, a communications satellite, a navigation satellite or a weather satellite which may be configured for many tasks. The present invention can thus be used in any observation electro-optic satellite and is especially useful in small satellites such as nano-satellites in which the volume of the external frame is critical. Alternatively, the deployable space vehicle may be a spacecraft equipped with an optical instrument. In this specific configuration, the optical system 102 is configured for imaging incoming radiation along optical axis O. The control system (not shown in the figure) is accommodated within the optical system 102 (represented as a cylinder) for stowage. In this way, for an optical system having a given volume, the volume of observation satellite 200 (e.g. of the external frame) at the time of launch may be significantly reduced as compared with conventional space vehicles, in which the control system(s) are placed adjacently to the optical system. It should be understood that in these conventional configurations, the control system(s) occupy a space in the frame adjacent to the optical system to enable operation of the optical system and to not obstruct its field. The volume of such space vehicles is thus increased, as compared with the space vehicle of the present invention, in which the inventors have found that the internal volume of the optical system can be exploited. In existing systems, this volume is not occupied. The present invention may thus solve the problem of volume at the time of launch by reducing the volume of the satellite by using the free space within the optical system. In other words, the folding of the control system(s) within the optical system enables to reduce the external volume of the space vehicle to fit the volume of a canopy at the time of launch.

It should also be noted that by deploying the control systems, and not the optical element as conventionally used in deployable space vehicles, the accuracy requirements of the folding mechanism are lower by at least two orders of dimension than the accuracy requirements of existing solutions. More specifically, the accuracy requirements of the folding mechanism of the present invention are in the order of millimeters, while the accuracy requirements of existing optical solutions are in the order of microns. Moreover, it should be noted that the configuration of the present invention, in which at least one control system is deployed, eliminates the need for calibration or adjustment of optical elements/instruments, for example: of the secondary mirror relative to the primary mirror, and of the direction of the optical element line of sight (LOS) relative to the space vehicle main axes after deployment. In the space vehicle of the present invention, there is no need for a directional means aimed at controlling the position of the different elements for directing the optical axis of the system.

Alternatively, exploitation of the free space within the optical system may enable to optimize the electro-optic performance of the space vehicle for a given volume of the external frame. For example, the optical system might have a larger volume leading to an increase in optical properties of the optical system and of performance of the optical system as well as of the space vehicle.

Figure 3:
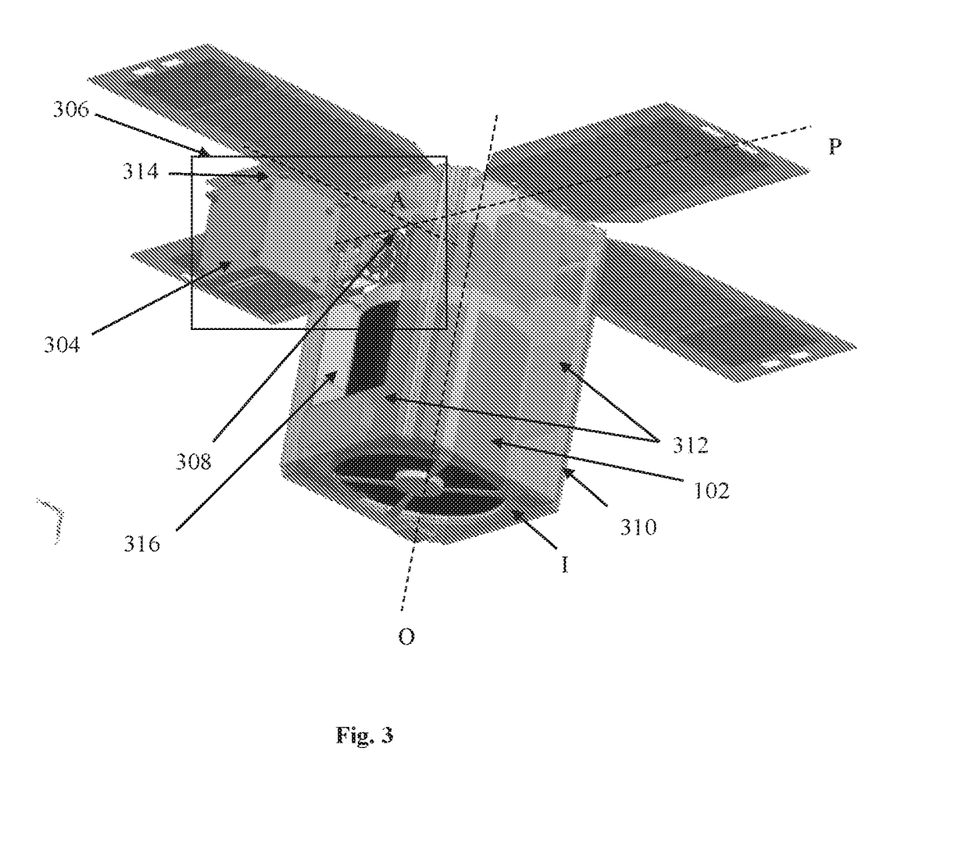
FIG. 3 shows a schematic side view of a possible configuration of the deployable space vehicle in one possible deployed position according to some embodiments of the present invention.

Reference is made to FIG. 3, representing a side view of a space vehicle 300 according to some embodiments of the present invention, being in this specific and non-limiting example a satellite in its deployed position. In this specific and non-limiting configuration, space vehicle 300 comprises a holding assembly 306 holding a control system(s) 304 and having a folding mechanism (not shown) being configured and operable for being pivotally displaceable around an axis P substantially perpendicular to the optical axis O of the optical system 102. The axis of deployment A is in this case substantially perpendicular to the optical axis O of the optical system 102. In the folded position, control system 304 is accommodated in the free space within the optical system 102. The space vehicle may comprise a frame (e.g. body) 310 comprising a plurality of surfaces 312 (only two of them are shown in the figure) forming the internal cavity I and at least one opening 316 in the frame 310. Holding assembly 306 is mounted on one of the plurality of surfaces 312 and at least partially covers the opening 316 when the control system 304 is in its folded position. Holding assembly 306 is configured to move the control system 304 between a folded position and a deployed position for operation out of the frame 310. In this configuration, folding mechanism 308 comprises a support surface 314 carrying the control system 304 and an axial hinge placed at the axis P connecting between one of the surfaces 312 of the frame and the support surface 314. As illustrated, in the deployed position, the support surface 314 is substantially perpendicular to the optical axis O of the optical system. In this specific and non-limiting example, the axial hinge has a main direction P substantially perpendicular to the optical axis O. In this specific and non-limiting example, optical system 102 is a telescope disposed within the interior cavity I.

Figure 4:
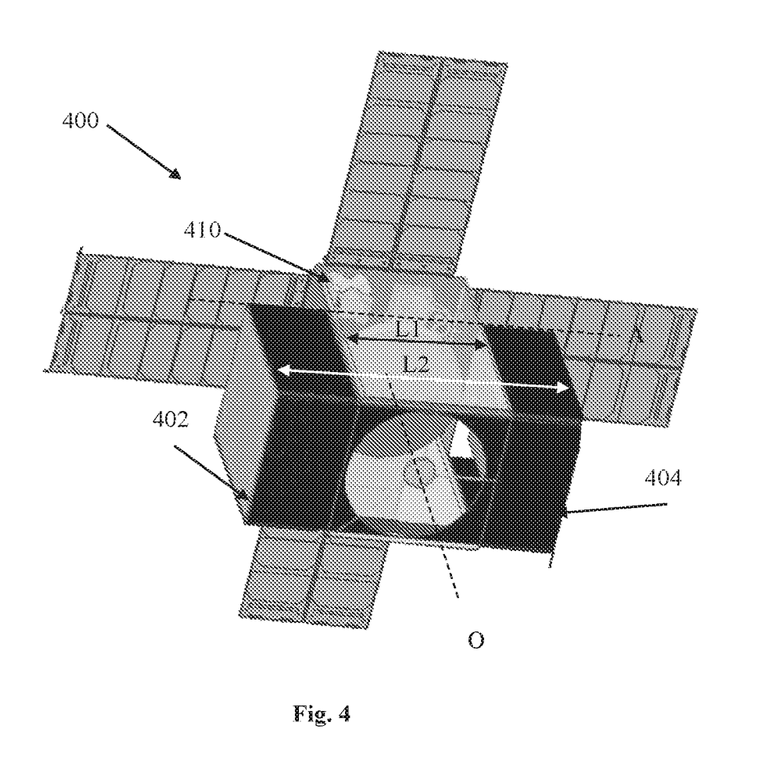
FIG. 4 shows a schematic bottom view of a possible configuration of the deployable space vehicle in another possible deployed position according to some embodiments of the present invention.

Reference is made to FIG. 4 representing a bottom view of a space vehicle 400 according to some embodiments of the present invention being in this specific and non-limiting example a satellite in its deployed position. In this specific and non-limiting configuration, space vehicle 400 comprises a plurality of control systems 402 and 404 each being configured to be deployable and mounted on a holding assembly (not shown) respectively. The control system may be an Attitude and Orbital Control System (AOCS) and/or any other electronic unit and/or any other mechanical unit. For example, the control system may be configured for receiving and transmitting data signals. The control system may be an assembly of on-board equipment and software which provides the control function of a space vehicle aimed at, for example, setting it with the desired attitude and adjusting its orbit to the requirements of the mission. The electronic unit may comprise a transceiver permitting to be connected to a communication unit and to transmit and/or receive data. The control system may comprise any physical element performing one or more functions for enabling operation of the vehicle, such as a processing unit configured to control space vehicle operations and/or an image processing module configured to process imaging data collected by the optical system and/or a guiding module configured for guiding the vehicle and/or a receiving/transmitting device configured for receiving/transmitting signals and/or an amplifier device operable for amplifying signals received by the receiver and/or at least one power source configured for supplying voltage supply to the vehicle and/or inertia wheel(s), or any satellite system. In some embodiments, the control system may be configured as an electronic image module for collecting and processing imaging data. It should be noted that all required control operations (such as control space vehicle operations, processing imaging data, performing corresponding calculation operations, guiding the vehicle, receiving/transmitting signals, amplifying signals, supplying voltage supply to the vehicle . . . ) may be controlled by means of a processing unit, such as a DSP, microcontroller, FPGA, ASIC, etc., or any other conventional and/or dedicated computing unit/system. The term "processing unit" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. The processing unit may comprise a general-purpose computer processor, which is programmed in software to carry out the functions described hereinbelow. Also, operations in accordance with the teachings herein may be performed by a computer specially constructed for the desired purposes or by a general purpose computer specially configured for the desired purpose by a computer program stored in a computer readable storage medium. The control system includes inter alia a signal generator, and at least one utility part (suitable software and/or hardware) for generating a signal indicative of an operation to be performed by any module of the space vehicle. The different elements of the control system (electronic unit and/or mechanical unit) are connected to each other by wires or wireless. The software may be downloaded to the processing unit in electronic form, over a network, for example, or it may alternatively be provided on tangible media, such as optical, magnetic, or electronic memory media. Alternatively or additionally, some or all of the functions of the control unit may be implemented in dedicated hardware, such as a custom or semi-custom integrated circuit or a programmable digital signal processor (DSP).

In this specific and non-limiting configuration, two holding assemblies are mounted on substantially parallel faced surfaces of space vehicle 400 holding control systems 402 and 404 respectively. Each holding assembly has a folding mechanism (not shown) being configured and operable for being longitudinally displaceable along an axis A of deployment being substantially perpendicular to the optical axis O of the optical system. In this specific and non-limiting example, each axial hinge has a main direction A deploying each control system 402 and 404 in opposite longitudinal directions (leftward and rightward) along the axis of deployment A. In the folded position, control systems 402 and 404 are accommodated in the free space within the optical system 102. Each support surface may thus be hinged to one of the surfaces of the space vehicle 400 about a respective hinge axis to enable the control systems 402 and 404 to be selectively longitudinally displaced about the respective hinge axes with respect to one another from an undeployed configuration to a deployed configuration. In this specific and non-limiting configuration, in the deployed position, the support surface(s) may be substantially parallel to the optical axis O. In the undeployed configuration, frame 410 of space vehicle 400 has a first length dimension L1, and in the deployed configuration frame 410 has a second length dimension L2. The second length dimension L2 is greater than first length dimension L1.

Figure 5:
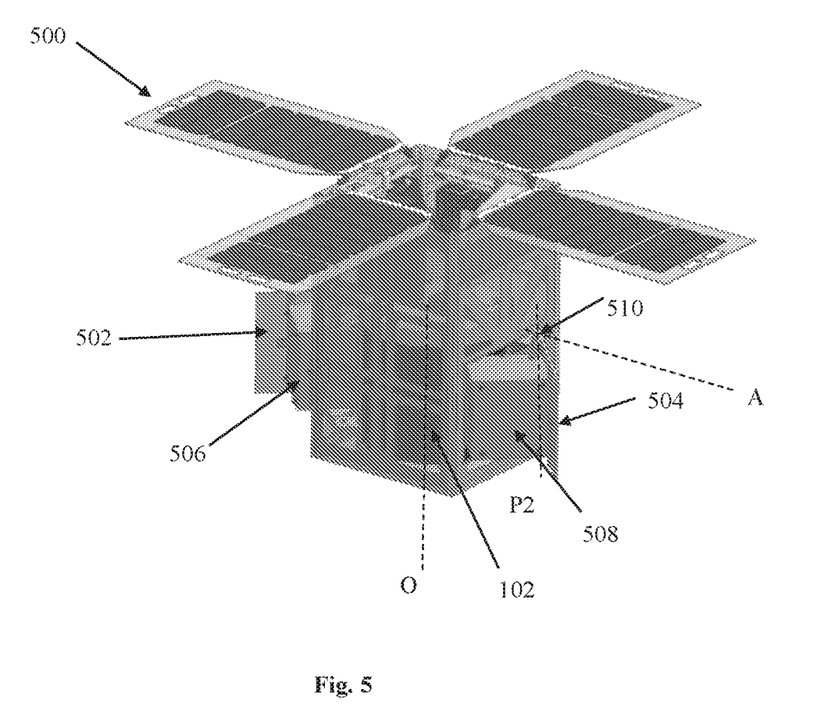
FIG. 5 shows a schematic side view of a possible configuration of the deployable space vehicle in another possible deployed position according to some embodiments of the present invention.

Reference is made to FIG. 5, representing a side view of a space vehicle 500 according to some embodiments of the present invention, being in this specific and non-limiting example a satellite in its partly deployed position. The figure shows the space vehicle 500 at an intermediate stage of the deployment. In this specific and non-limiting configuration, space vehicle 500 comprises two holding assemblies 502 and 504 holding two control systems 506 and 508. Each holding assembly 502 and 504 has a folding mechanism being configured and operable for being pivotally displaceable around an axis P1 (not shown) and P2 respectively substantially parallel to the optical axis O of the optical system 102. When completely deployed (position not illustrated in this figure), the axis of deployment A is substantially perpendicular to the optical axis O of the optical system 102. In this specific and non-limiting configuration, two holding assemblies 502 and 504 are mounted on substantially parallel faced surfaces of space vehicle 500. As illustrated, holding assembly 504 comprises an axial hinge 510 having a main direction P2 substantially parallel to the optical axis O. In the folded position, control systems 502 and 504 are accommodated in the free space within the optical system 102.

The invention claimed is:

1. A space vehicle, comprising:
   an optical system having a field of view, the optical system comprising at least two optical elements spaced from one another along an optical axis of the optical system, thereby defining an interior cavity of the optical system;
   a plurality of holding assemblies, each of the plurality of holding assemblies comprising a folding mechanism configured and operable to move between a folded position corresponding to an inoperative mode of the optical system, and a deployed position corresponding to an operative mode of the optical system; and
   a plurality of control systems each comprising at least one physical element configured for performing one or more functions for enabling operation of the space vehicle, each of the plurality of control systems configured to be deployable and mounted on a respective one of the plurality of holding assemblies operable to move between the folded position and the deployed position;
   wherein, when in the folded position of the folding mechanism, at least one of the plurality of control systems being held by a respective one of the plurality of holding assemblies is at least partially located in said interior cavity of the optical system for stowage; and
   wherein, when in the deployed position of the folding mechanism, said at least one of the plurality of control systems being held by the respective one of the plurality of holding assemblies is located outside said interior cavity and outside said field of view of the optical system, thereby allowing operation of the optical system.

2. The space vehicle of claim 1, wherein said optical system comprises a telescope having a primary optical element and a secondary element; said at least one of the plurality of control systems being positioned in between said primary and secondary elements.

3. The space vehicle of claim 1, wherein said plurality of control systems comprise at least one of a processing unit configured to control space vehicle operations, an image processing module configured to process imaging data collected by said optical system, a guiding module configured for guiding said vehicle, at least a receiving/transmitting device configured for receiving/transmitting signals, an amplifier device operable for amplifying signals received by the receiver, and at least one power source configured for supplying voltage supply to the vehicle.

4. The space vehicle of claim 1, wherein said folding mechanism is configured and operable for being pivotally displaceable around an axis perpendicular to said optical axis.

5. The space vehicle of claim 1, wherein said folding mechanism is configured and operable for being pivotally displaceable around an axis parallel to said optical axis.

6. The space vehicle of claim 1, wherein said folding mechanism is configured and operable for being longitudinally displaceable along an axis perpendicular to said optical axis.

7. The space vehicle of claim 1, further comprising a frame comprising a plurality of surfaces forming an internal cavity and at least one opening in the frame, wherein said at least one of the plurality of holding assemblies is mounted on at least one of the plurality of surfaces and at least partially covers said at least one opening when said plurality of control systems are in its folded position.

8. The space vehicle of claim 7, wherein said folding mechanism of at least one of the plurality of holding assemblies comprises at least one support surface carrying a respective one said plurality of control systems and an axial hinge connecting between one of the surfaces of the frame and the support surface.

9. The space vehicle of claim 8, wherein in the deployed position said at least one support surface is substantially perpendicular to said optical axis of the optical system.

10. The space vehicle of claim 8, wherein in said deployed position said at least one support surface is substantially parallel to said optical axis of the optical system.

11. The space vehicle of claim 8, wherein said axial hinge has a main direction substantially parallel to said optical axis.

12. The space vehicle of claim 8, wherein said axial hinge has a direction substantially perpendicular to said optical axis.

13. The space vehicle of claim 1, wherein the space vehicle is configured as a satellite or a spacecraft.

* * * * *